(12) United States Patent  
Itse et al.

(10) Patent No.: US 8,075,858 B1
(45) Date of Patent: Dec. 13, 2011

(54) TRUMPET SHAPED ELEMENT AND PROCESS FOR MINIMIZING SOLID AND GASEOUS POLLUTANTS FROM WASTE OFF-GASSES AND LIQUID STREAMS

(75) Inventors: Daniel C. Itse, Freemont, NH (US); David C. Itse, Manchester, NH (US)

(73) Assignee: White Cliff Technologies, LLC, Milford, NH (US)

( * ) Notice: Subject to any disclaimer, the term of this patent is extended or adjusted under 35 U.S.C. 154(b) by 0 days.

(21) Appl. No.: 12/807,060

(22) Filed: Aug. 26, 2010

Related U.S. Application Data

(60) Provisional application No. 61/278,399, filed on Oct. 7, 2009, now abandoned.

(51) Int. Cl.
*B01D 53/34* (2006.01)
*B01D 53/74* (2006.01)
(52) U.S. Cl. ............ 423/210; 422/168; 110/203
(58) Field of Classification Search .......... 423/210; 422/168; 110/203
See application file for complete search history.

(56) References Cited

U.S. PATENT DOCUMENTS 4,722,287 A * 2/1988 Anderson et al. ............. 110/263
5,186,914 A * 2/1993 Yoshihiro et al. .......... 423/239.1

FOREIGN PATENT DOCUMENTS

JP    4-131122 A  *  5/1992
JP    4-358518 A  * 12/1992

\* cited by examiner

*Primary Examiner* — Timothy Vanoy
(74) *Attorney, Agent, or Firm* — Stephen W. White

(57) ABSTRACT

An injector element that can be used to inject pollution reacting chemicals or other reactants into a container of waste gas or aqueous streams so as to improve the function of the process by removing any pollutants contained therein. This injector element has an exit defined as a trumpet-shaped device which forms an angle of 45 to 135 degrees between the axial line formed by the placement of the injector element within the waste gas or aqueous stream. This device is eminently suitable for use in solid, liquid or gas fired steam generating facilities. By placing the device just above the waste gas stream generated by the boiler the early removal of the pollutants using this element can enable the facility to comply with environmental regulations and increase the steam generating efficiency of the facility.

7 Claims, 6 Drawing Sheets

TRUMPET SHAPED ELEMENT AND PROCESS FOR MINIMIZING SOLID AND GASEOUS POLLUTANTS FROM WASTE OFF-GASSES AND LIQUID STREAMS

CROSS-REFERENCE TO RELATED APPLICATIONS

This invention is claims the benefit under 35 USC 119(e) to our previously filed Provisional Application Ser. No. 61/728, 399, filed Oct. 7, 2009 and is also related to Assignee's Patent Application, U.S. Ser. No. 12/387,157, now abandoned, and is an improvement thereof.

BACKGROUND OF THE INVENTION

This invention particularly relates to a novel element and process for injecting gasses, gas mixtures, gas-liquid mixtures, gas-solid mixtures, liquid mixtures or liquid-solid mixtures into streams of air, gas, gas mixtures, gas-liquid mixtures, liquid mixtures, liquid-solid mixtures or gas-solid mixtures emanating from furnaces, flue ducts and exhaust ducts in order to remove or minimize gaseous and solid pollutants from within these waste streams. Even more particularly this invention relates to such an element and process that accomplishes such removal or minimization of pollutants using techniques that have fewer moving parts and injects reagents in a more effective and efficient manner. Still more particularly, this invention relates to an element and process for removal of pollutants from furnaces and the like in a more cost-effective manner than the prior art. This invention also relates to a device that can also be used to remove pollutants from liquid streams.

DESCRIPTION OF THE PRIOR ART

There is a pressing need within the field of chemical producing systems, electrical generating facilities, metal furnaces, biomass burning devices and the like to ensure that pollutants that may be produced during these processes are removed prior to emission into the atmosphere. There is also a pressing need to remove pollutants from liquid streams such as sewer lines and such. Many of these pollutants are dangerous to the environment and many governments have started requiring businesses to reduce these pollutants under the threat of fines and other means. Thus, many of these producers have been working hard to not only reduce the effluent gasses but also to scrub them clean in order to meet governmental requirements. However, many of the prior art scrubbing processes and devices are difficult to install and maintain and add enormous costs to the producer.

There are a host of devices offered in the prior art all of which claim to efficiently remove pollutants from waste gasses emitted by furnaces, for example. Some of these devices employ the use of chemical and solutions that include chemicals that will react with these pollutant-containing gases reducing their emissions and/or precipitating these pollutants from these streams. These elements can be more efficient than scrubbing systems but have been difficult to employ easily and are just as costly. Also, these devices do not always fully remove the pollutants to the extent desired or as experienced during development of the actual equipment, due to mixing limitations that result when the devices are employed. The scrubbing systems usually take the entire polluting stream of gases and pass this material through a solution or reactant in order to attempt pollutant removal. None of these prior art devices are totally efficient and all require complex machinery and costly installation. In addition, the prior art devices tend to be easily degraded within the hot and dirty waste gas streams. Also, these prior art scrubbing and injection systems are extremely costly to produce and maintain.

Specifically speaking about injection processes these may include over-fire air, flue gas recirculation, injection of reagents such as ammonia and urea for selective non-catalytic $NO_x$ reduction and sorbents such as lime, limestone, sodium carbonate, sodium bicarbonate and activated carbon. These are used as injected streams into furnaces, their flues and exhaust ducts. Part of the difficulty in using these injection processes, known as jets in cross flow, is the mixing of the injected flow with the bulk flow in anticipation of removing pollutants there from. The simplest of these processes is an axial flow jet. The trajectory and mixing of the injection jet is controlled by the injection jet momentum relative to the momentum of the bulk flow and the injection jet hydrodal diameter. The designer of such a system has to make a tradeoff between deep penetration, mixing of the jet into the center of the flow and mixing the jet near the wall of the furnace, flue or duct emanating there from. Modern computation fluid dynamics modeling has made the prediction of jet mixing more precise, but the trade-offs remain and the accuracy is dependent on the correctness of the assumptions made about the uniformity of the flow and concentration distribution of the bulk flow throughout the effluent gasses. The ability to optimize the mixing of the injected flow with the bulk flow to accommodate uncertainties in the assumed flow distribution of the bulk flow is essential.

To solve this dilemma designers have created a number of methods to alter the mixing of injection jets with bulk flow. The simplest method is a louver damper which can control the jet direction in at least one plane. However this approach does not have a large effect on mixing near the injector versus deep into the bulk flow. A more sophisticated approach might use a series of multiple concentric jets with the outer annulus swirled. These prior art solutions do not entirely answer all of the requisite questions and some are difficult and complicated to use. Additionally, since there are multiple moving parts within these prior art jet mixing devices there is the on-going problem of corrosion, warping and plugging since the moving parts are kept exposed to the waste stream and, if in furnaces, high thermal radiation. These characteristics tend to degrade the equipment requiring frequent maintenance and replacement.

In past and more recent developments certain injector elements have been developed that have a conical exit for insertion of scrubbing materials into gaseous and liquid systems where pollution exists. Although these prior art flute-like exit points have performed well, they have not been able to significantly reduce the pollutants as once thought and is currently desired. Thus, there is this pressing need to have an adequate system that will not only reduce the pollutants produced but can be installed and maintained efficiently and reduce costs associated therewith.

SUMMARY OF THE INVENTION

It is an object of this invention to provide an element that can be used to remove pollutants from waste gas and liquid streams. It is yet another object of this invention to provide such a pollutant removing device that can be used to inject gases, gas mixtures, gas-liquid mixtures or gas-solid mixtures into these waste gas streams in order to more effectively remove pollutants contained therein. Still another object of this invention is to provide an injection containing element for removing pollutants from waste gas streams in an effective and manageable way. Yet another object is to provide an injection containing element that has fewer moving parts and can be easily maintained. These and yet other objects are achieved in an injector element for the reduction or removal of pollutants from streams containing waste gases by injecting gas mixtures, gas-liquid mixtures or gas solid mixtures comprising:

a. a hollow, outer tube with a longitudinal axis and two ends, one of said ends being an inlet end and the other being an outlet end;

b. an axially controllable smaller hollow pipe with an inlet end and an outlet end inserted longitudinally within said outer tube so that said inlet end and said outlet end match with said inlet end and said outlet end of said outer tube;

c. a connecting rod connected to said inlet end of said smaller pipe to control said axial position of said inner pipe along the longitudinal axis of said hollow, outer tube;

d. a trumpet-like shaped exit at said outlet or said pipe fitting snugly within said tube and which forms a valve regulating flow within the annulus formed between said tube and said pipe.

so that when a pollution containing waste stream in a closed venting container is permitted to flow past and perpendicular to said outlet end of said tube and a pollution reacting stream is caused to flow into said inlet end and to exit from said outlet end of said tube, said trumpet-like shape on said outlet end of said pipe create both an outer flow and an inner-flow of said pollution reacting stream on said waste stream enhancing mixing with said waste stream both in the center of the waste stream flow and periphery of the waste stream flow so that said pollutants are removed from said waste stream.

To understand the action described above the outer flow is directed to mix with the pollutant containing stream near the wall were the injector is located. The inner flow is directed to mix with the pollutant flow far from the wall were the injector is located. In yet another embodiment of this invention a series of axially fanned, vane elements may also be circumferentially located around the outside of said outlet end of said pipe near said outlet. These vanes impart swirl to the outer flow enabling the injected flow to be directed to one side. In yet another embodiment of this invention the device described herein may be used to reduce pollutants within aqueous streams, for example, following the same techniques described herein.

DETAILS OF THE INVENTION

Figure 1:
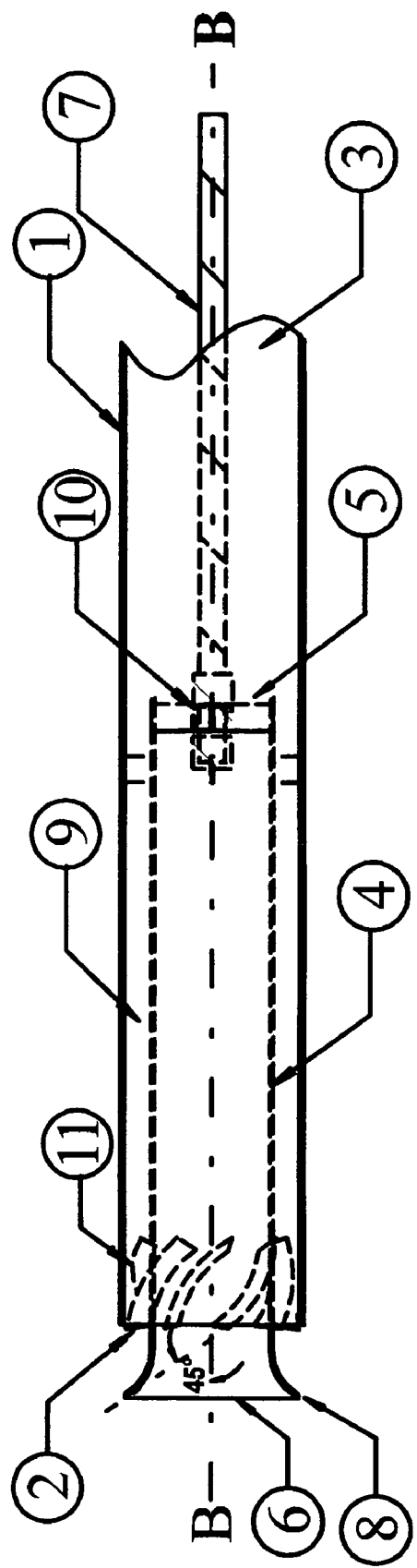
FIG. 1 is a side view of a particularly injector preferred element with the trumpet exit at the minimum exit angle of 45° containing a series of axially fanned, vane elements.

Looking now specifically at the drawings, which show one of the best modes of this invention at the time of filing, FIG. 1 is a side view of a particularly preferred element of this invention as it would appear outside of the waste stream. In this showing 1 is an outer, hollow tube with two ends 2 and 3. Inserted within hollow tube 1 (and shown by dashed lines) is an axially controllable pipe 4 which is also hollow and contains an inlet end 5 and an outlet end 6 which are also aligned longitudinally with inlet 3 and outlet 4 of hollow tube 1. Connected to the inlet end 5 of tube 4 is a controlling rod 7. Rod 7 is designed to move tube 4 along the longitudinal axis of 1 through a controlling point 10. The outlet 6 of hollow tube 1 is formed into a trumpet shaped exit shown as 8. A series of vanes, one of which is shown as 11, surrounds the outlet end 6 just below the trumpet shaped exit 8. It is this entire end that is inserted into the flow of waste off-gasses containing pollutants (not shown herein). From entrance 3 other gaseous materials may be caused to move into the waste stream to react with the pollutants and remove them from the stream. It is the trumpet shape of the exit 8 along with the vanes 11 that causes a swirling motion within the waste off-gasses and an excellent mixing of the two streams (waste and entrance gasses). The space 9 between the axially controlled pipe 4 and the outer, hollow tube 1 will also carry inlet gasses in a like manner. In this particular view, the trumpet shape is at about a 45 degree angle from a straight line defined by the entire element itself and shown as a dashed line B-B'.

Figure 2:
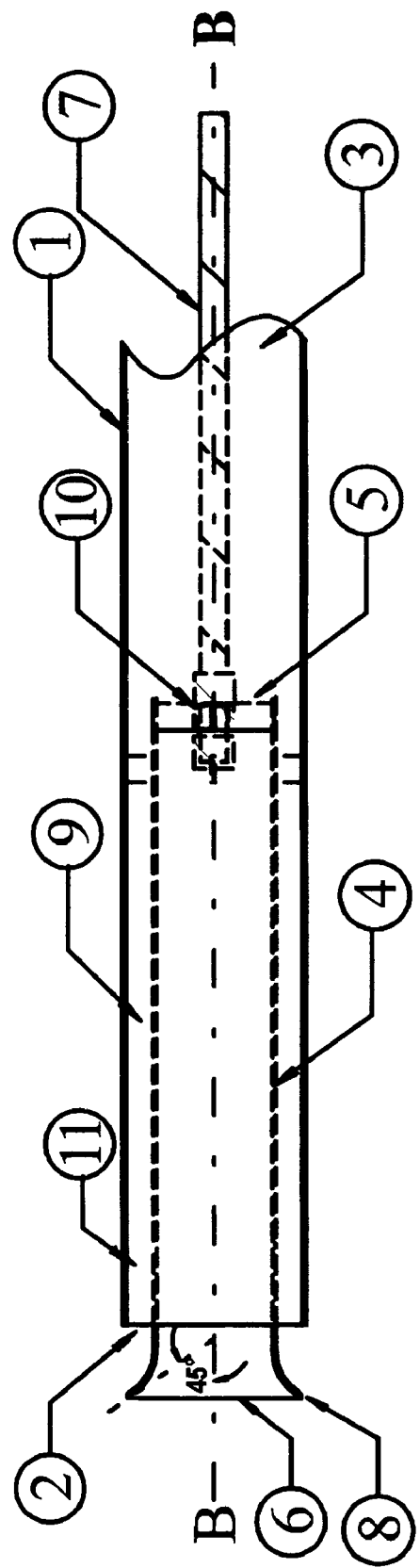
FIG. 2 is a side view of the element of FIG. 1 with the trumpet exit at the minimum exit angle of 45° without the series of axially fanned, vane elements.

FIG. 2 is a similar device from FIG. 1 except without the axially fanned vanes located nearby the trumpet shaped exit point. All of the parts interior thereto are numbered the same as FIG. 1.

Figure 3:
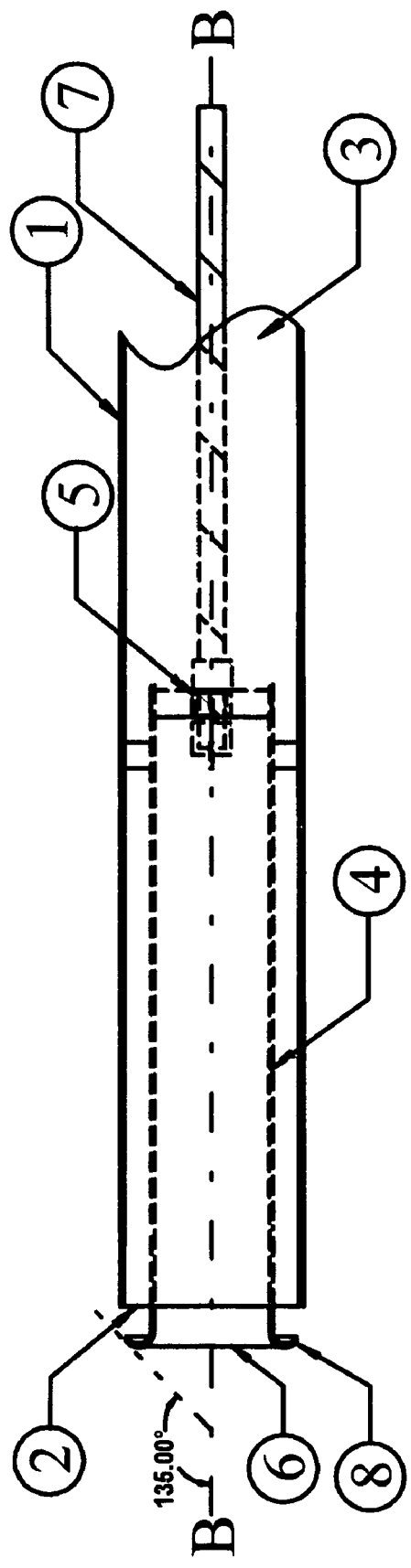
FIG. 3 is a side view of the element of FIG. 1 with the trumpet exit at an angle of 135° without vanes.

FIG. 3 is yet another embodiment of the device shown in FIG. 1 wherein the trumpet shaped exit is amplified by bending at 135 degrees off of the straight line defined by the entire element.

Figure 4:
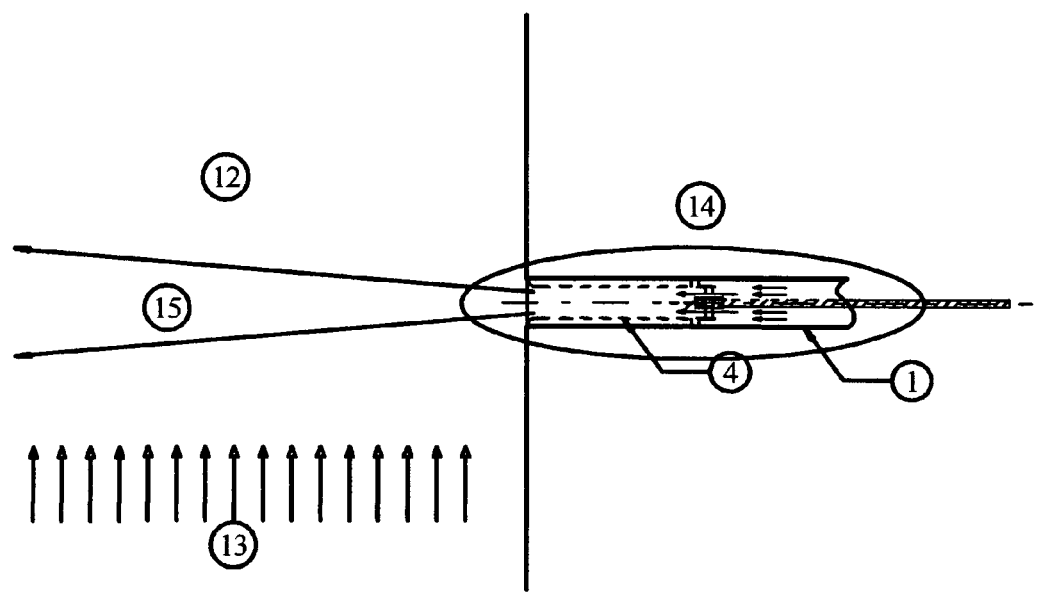
FIG. 4 shows a prior art injector device and the distribution pattern of injection within the flow of a chamber carrying polluting off-gases.

FIG. 4 shows the trumpet shaped device with the hollow tube 4 in FIG. 2 positioned so that all the flow passes inside the hollow tube 4 and the distribution pattern of the materials injected within the flow of chamber that carries polluting off-gases. In this figure the flow of gasses in a chamber 12 is shown as a series of arrows 13. The device in FIG. 2 is shown as 14 and the flow of that injected by 14 is shown as 15. One can easily see that that in this extreme (which mimics the prior art) the injected flow does not mix well with the flow of pollution containing off-gases.

Figure 4A:
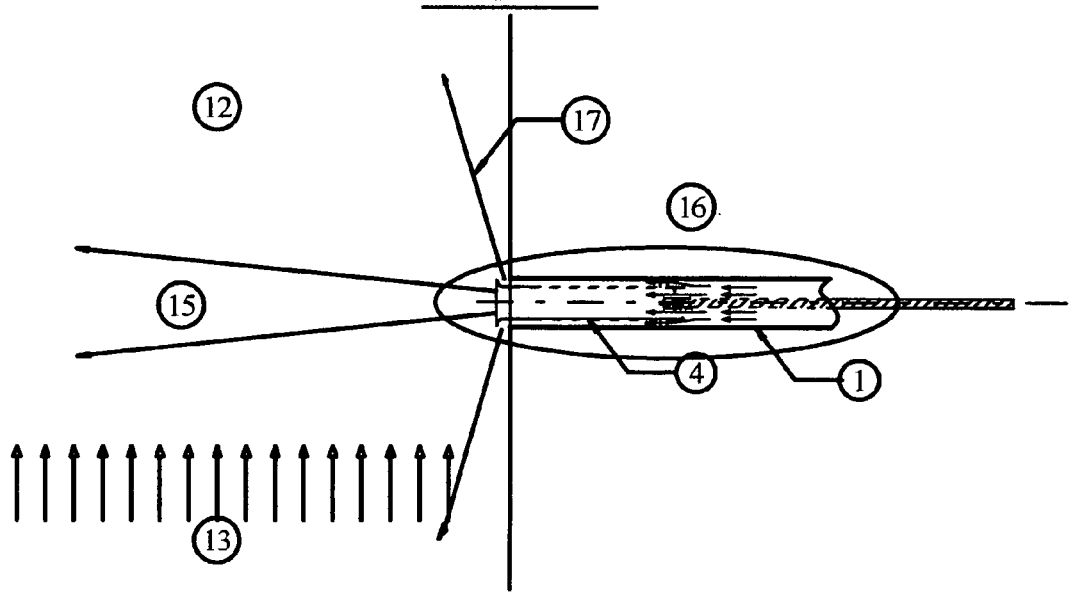
FIG. 4a shows one of the devices of this invention (non-vaned) and the improvement in the distribution pattern of the injection within the flow of a chamber carrying polluting off-gases.

FIG. 4a shows a trumpet shaped device of this invention 16 positioned so that the flow passes both inside and outside the hollow tube 4. In this particular showing not only is there an amount of injected material 15, equivalent to that of FIG. 4 but that a portion of that material shown as 17 which now mixes near the wall indicates that greater contact can be achieved by the element and process of this invention. This also shows how this device can be used to vary the proportion of material injected near the wall.

Figure 5:
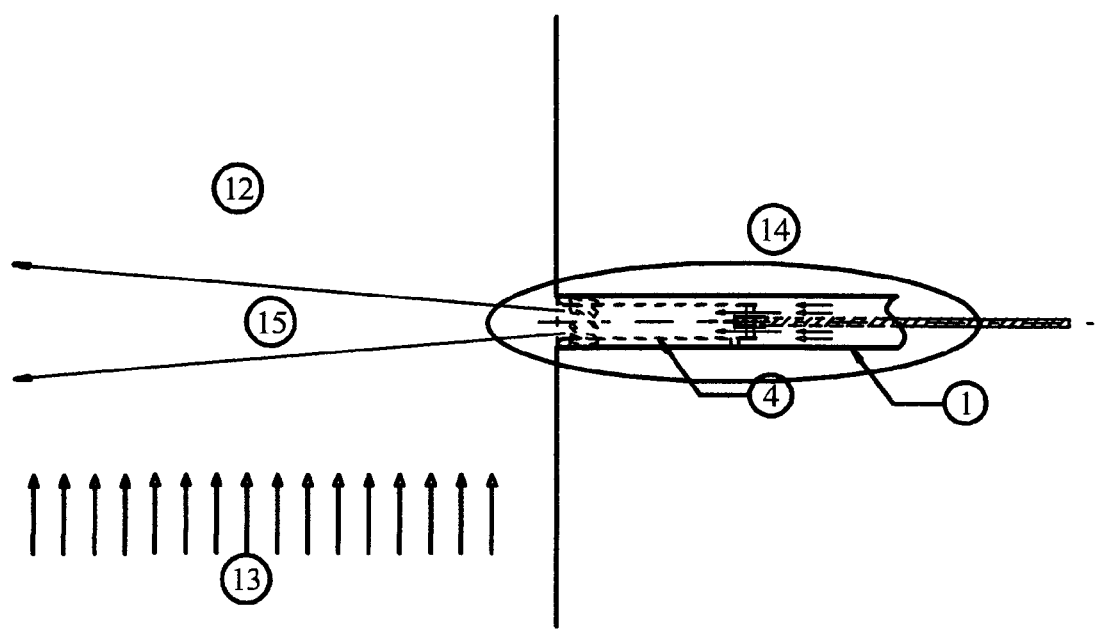
FIG. 5 is identical with FIG. 4 shown next to FIG. 5a which shows the vaned device of this invention and the improvement in the distribution pattern of the injection within the flow of a chamber carry polluting off-gases.
Figure 5A:
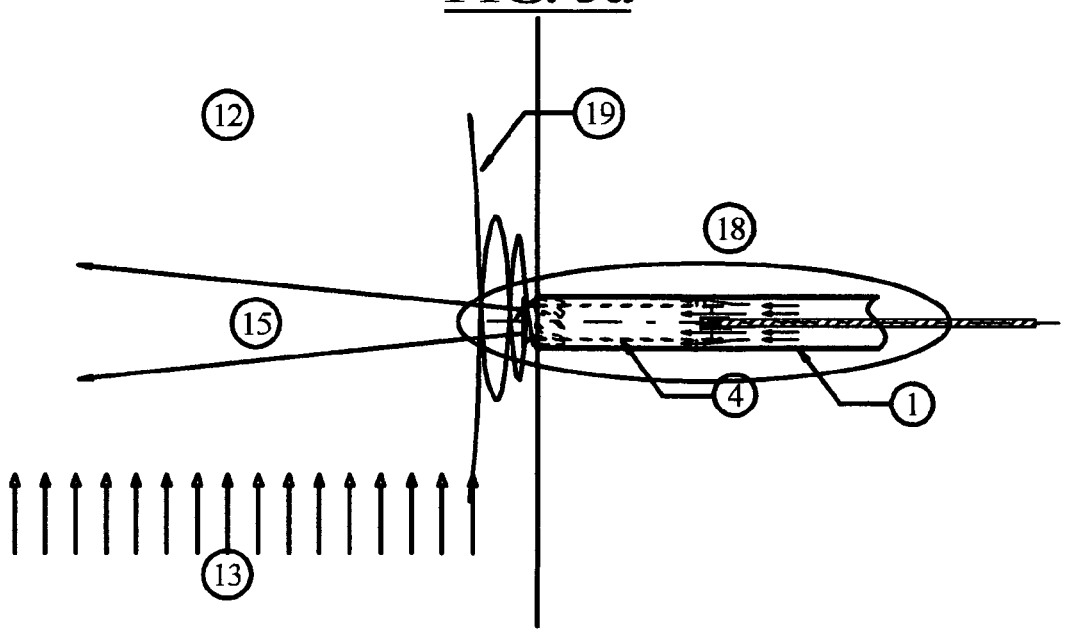

FIGS. 5 and 5a shows the effect of the position the trumpet shaped device including axially fanned vanes element. Once again, FIG. 5 shows the device with the same numbered elements from FIG. 4 with no flow outside the hollow tube 4. FIG. 5a is the trumpet shaped element containing the vanes with the flow inside and outside the hollow tube 4 and is shown as 18 which not only distributes pollution reducing material in the same manner as FIG. 4a but also swirls and broadens out the material even more so that additional contact may be made by the material and the pollution containing off-gasses. This swirling effect is shown as 19.

Figure 6:
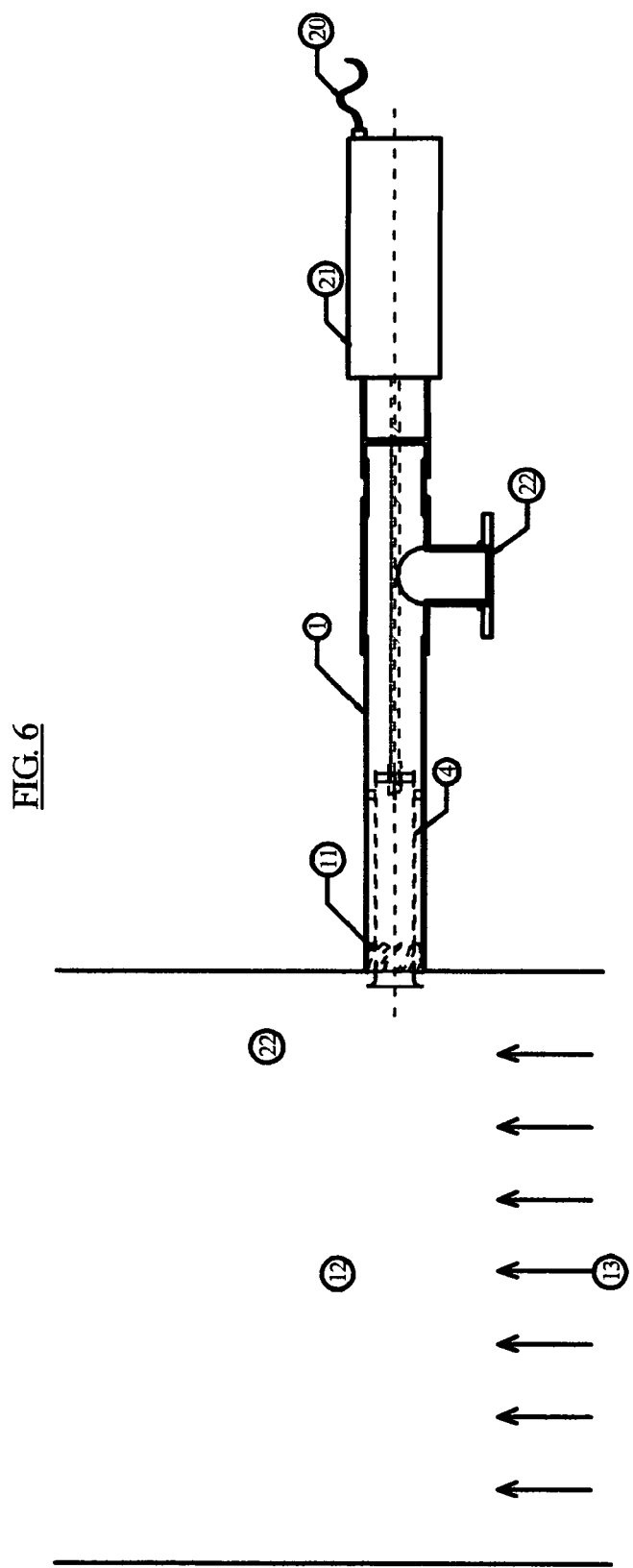
FIG. 6 is a more detailed showing of the injection device of FIG. 3 installed on a chamber that contains pollution containing off-gasses.

FIG. 6 is a detailed showing of the device from FIG. 1 attached to a device designed to carry off-gasses containing pollutants. In this figure one can see the trumpet shaped, axially fanned vaned device 1 containing the various parts as shown in FIG. 3 attached to this chamber. The device shown as 21 is an electrical drive motor that will drive the device which has an electrical circuit shown as 20. That shown as 22 represents the inlet to the injection for the material that can react with the off-gasses and remove the pollutants contained therein.

The injectors of this invention can be made from a number of materials. We prefer stainless steel since parts made of this metal are more resistant to the corrosive atmosphere found in most effluent gases coming from metal refineries; steam generating facilities; and other processes similar to these. The injectors of this invention are placed in suitable positions to capture the most pollutants emanating from the process involved. Only a small portion of each injector will be in contact with the waste gas stream thus reducing further contact of elements with such corrosive emissions. There are essentially few moving parts within the ambit of this invention. There is only the hollow pipe that extends laterally in an axially manner down the hollow outer tube and the axial control rod which is well removed from the pollutant containing stream . . . . This pipe can be adjusted in this longitudinal direction in order to increase or decrease the amount of the reacting stream the operator decides is requisite to getting more or less swirling action, action that will stay closer to the side walls of the furnace or gas emitting duct to optimize the reduction of pollutant emissions. Tests are usually made of the gas that exits out of the chimney or other stack and thus it may be requisite to increase the flow of the reacting stream into the center or to increase the flow of the pollutant reacting stream in a swirling nature in the furnace or duct to improve mixing.

There are a plethora of materials that are commonly used as a reacting stream or as carriers for other reactants including air, flue gas, exhaust gas and inert gases. There are other chemical reactants that may be carried by these gases such as ammonia, urea, sodium bicarbonate, lime, hydrated lime, limestone, activated carbon, vermiculite among others, for example. These injectors can be located in a variety of places along the emanating stream and the reacting stream to react with the pollutants and cause reduction and/or precipitation of pollutants in a harmless way so they can be safely removed from the gas stream.

What we have discovered here that it is the shape of the exit of the injector element that is what will provide the maximum separation of the outer flow from the inner flow and the mixing gasses and/or elements added to the waste gasses. It is imperative that this separation of flows be achieved in order to completely mix the reagent with the waste gases and maximize the removal of the various pollutants. We have found through computer modeling that the mixing motion of a trumpet-like shaped exit element is far superior than any conventional exit offered within the prior art, including straight tubes or even a conical exit. The separation of the outer flow from the inner flow will occur as desired by the depth of insertion of the injector element within the waste gas stream. It can be made to occur to one side or the other of the waste gas stream or even through the entire stream itself. By using a plethora of injector elements along the waste gas stream we can remove most of the pollutants contained therein. In addition, a waste aqueous stream that contains pollutants (e.g. liquid waste streams from chemical plants and the like or even sewage effluent streams) can be treated using the injector element of this invention. One can inject an aqueous stream containing the desired chemical for treatment and be ensured that good mixing will take place along the aqueous waste stream.

Injectors made according to the teachings of this invention and applied to most any of the pollution containing waste gas streams known in the prior art can be used in the manner taught herein to safety and efficiently remove these pollutants. The injectors are easy and less costly to use since they have a longer in-operation life and are simpler.

We claim:

1. An injector element for the reduction or removal of pollutants from streams containing waste gases and improving the operation thereof by injecting gas mixtures, gas-liquid mixtures or gas solid mixtures comprising:
    a. a hollow, outer tube with a longitudinal axis and two ends, one of said ends being an inlet end and the other being an outlet end;
    b. an axially controllable smaller inner tube with an inlet end and an outlet end inserted longitudinally within said outer tube so that inlet end and said outlet end match with said inlet end and said outlet end of said outer tube;
    c. a connecting rod connected to said inlet end of said smaller tube to control said axial position of said smaller tube along the longitudinal axis of said hollow, outer tube;
    d. a trumpet-shaped exit formed about the outlet end of said smaller hollow tube, said trumpet-shaped exit fitting snugly within said hollow, outer tube, and which serves to form a valve regulating the flow within an annulus formed between said outer and said inner tubes and wherein said trumpet-shaped exit forms an angle of between 45 and 135 degrees from a line along said longitudinal axis;

so that when a pollution containing waste stream in a closed venting container is permitted to flow past and perpendicular to said outlet end of said outer tube and a pollution reacting stream is caused to flow into said inlet end and to exit from said outlet end, said trumpet-shaped exit creates both and outer and inner flow pattern within said closed venting container enhancing the mixing of said pollution reacting stream with said pollution containing stream so as to improve contact, thereby enhancing the removal of said pollutants from said pollution containing stream.

2. The injector element of claim 1 wherein a series of axially fanned vane elements are located around the outside of said outlet end of said pipe near said trumpet-shaped exit.

3. The injector element of claim 1 wherein said connecting rod is movable along the axis of said tube so as to control the flow of said pollution reacting stream and to adjust the amount of inner and outer flow of said reacting stream inside said pollution containing stream.

4. The injector element of claim 1 wherein movement of said connecting rod is manually controlled.

5. The injector element of claim 1 wherein movement of said connecting rod is electronically controlled.

6. The injector element of claim 1 wherein said angle formed by said trumpet-shaped exit is between 80 and 135 degrees and said flow pattern of said pollution reacting stream fills said closed venting container.

7. A method of removing pollutants from waste gas streams from furnaces, flue ducts and exhaust ducts by introducing a pollutant removing stream comprising a gas, a gas mixture, a gas-liquid mixture, a gas-solid mixture or combinations thereof in said pollutant containing waste gas streams using the injector element of claim 1.

\* \* \* \* \*